United States Patent [19]

Piccirilli et al.

[11] 4,205,115

[45] May 27, 1980

[54] POLYESTER COATING COMPOSITION

[75] Inventors: Robert M. Piccirilli, Pittsburgh; Wen-Hsuan Chang; David T. McKeough, both of Gibsonia; Samuel Porter, Jr., Natrona Heights, all of Pa.

[73] Assignee: PPG Industries, Inc., Pittsburgh, Pa.

[21] Appl. No.: 897,963

[22] Filed: Apr. 19, 1978

[51] Int. Cl.² .................. B32B 27/40; B32B 27/06; B32B 27/36

[52] U.S. Cl. .................................. 428/334; 428/482; 428/423.1; 428/483; 428/524; 528/288; 528/291; 528/304; 260/40 R; 260/40 TN

[58] Field of Search .............. 528/288, 291, 304; 427/385 B; 260/40 R, 861, 405 N, 850; 428/425, 482, 483, 524, 334

[56] References Cited

U.S. PATENT DOCUMENTS

| 2,852,491 | 9/1958 | Caldwell | 528/288 |
|---|---|---|---|
| 2,925,405 | 2/1960 | Laakso et al. | 528/288 X |
| 2,970,986 | 2/1961 | Woodward | 528/288 |
| 3,427,267 | 2/1969 | Stieger et al. | 260/22 |
| 3,691,258 | 9/1972 | Riemhofer et al. | 260/850 |
| 3,893,976 | 7/1975 | Modler et al. | 528/288 X |
| 3,959,228 | 5/1976 | Massey | 528/288 X |
| 3,970,687 | 7/1976 | Braun | 528/288 X |

Primary Examiner—Michael R. Lusignan
Attorney, Agent, or Firm—William J. Uhl

[57] ABSTRACT

Coating compositions having a high degree of elasticity, as well as toughness, durability and good metallic pigment pattern control are disclosed. This combination of properties makes the coatings particularly desirable for use on elastomeric substrates such as those associated with automobiles. The coating compositions comprise as a resinous component, an ungelled hydroxyl-containing polyester of high weight average molecular weight. The polyesters can be cured with a curative such as an aminoplast to give coatings having outstanding elastomeric properties and good pigment dispersibility, particularly good metallic pigment pattern control, properties not normally associated with polyesters for use in coating applications.

25 Claims, 1 Drawing Figure

POLYESTER COATING COMPOSITION

BACKGROUND OF THE INVENTION

The present invention relates to a high molecular weight polyester for use in coating applications.

It is known in the art that polyester resins such as the alkyds and the so-called oil-free saturated polyesters can be deposited on substrates and cured with curing agents as coatings with good hardness and chemical resistance. However, such coatings are generally low in extensibility which restricts their usefulness. Such coatings do not have sufficient elasticity and long term flexibility to make them suitable as coatings for elastomeric substrates such as are used for automobiles.

Modern automobiles use significant and increasing amounts of plastic and elastomeric components in their manufacture which has increased the demand for coatings with a high degree of elasticity as well as toughness and durability. Examples of suitable elastomeric coatings are those which contain as the resinous component poly(ester-urethane) polyols cured with an aminoplast such as described in U.S. Pat. No. 3,962,522 to Chang and Hartman. However, these coatings are expensive to make because of the diisocyanate component. Polyesters cured with an aminoplast are an economical alternative to the poly(ester-urethanes) cured with an aminoplast; however, as mentioned above, they have not generally been satisfactory. Besides not having a high degree of elasticity nor flexibility upon exposure to the atmosphere, polyesters do not provide good metallic pigment pattern control which is necessary for metallic colors which are currently so popular in automotive paints.

SUMMARY OF THE INVENTION

Coating compositions of outstanding elasticity, good hardness, durability and metallic pattern control are produced by the use of a polyester resin in which the polyester has a hydroxyl value of about 10–160 and a weight average molecular weight of about 50,000 to 300,000 as defined by gel permeation chromatography using a polystyrene standard. The polyester is formed from reacting:

(A) 10 to 70 percent by weight of a difunctional active hydrogen component having two active hydrogens per molecule; the active hydrogens being selected from the class consisting of hydroxyl, primary amine, secondary amine; said active hydrogen component comprising:
  (1) 10 to 60 percent by weight of an acyclic diol having a carbon to oxygen ratio of at least 2,
  (2) up to 60 percent by weight of a cyclic diol,
  (3) from 0 to 20 percent by weight of a compound selected from the class consisting of diamines and hydroxyl-containing amines;
(B) 25 to 85 percent by weight of a dicarboxylic acid component comprising:
  (1) 5 to 85 percent by weight of an acyclic dicarboxylic acid containing from 2 to 36 carbon atoms,
  (2) up to 80 percent by weight of a cyclic dicarboxylic acid,
(C) up to 30 percent by weight of an active hydrogen component having at least three active hydrogens per molecule, the active hydrogens being selected from the class consisting of hydroxyl, primary amine, secondary amine and carboxylic acid;
(D) from 0 to 20 percent by weight of a monoamino monocarboxylic acid;
the percentages by weight being based on total weight of (A), (B), (C) and (D); the weight percentages of the reactants being adjusted such that the weight percentages of cyclic moieties in said polyester plus the weight percentages of amide moieties formed in said polyester multiplied by 4 is up to 35 and the weight percentages of the reactants being further adjusted such that these reactants contain about 0.01 to 1.0 gram-mole of reactants having a functionality of 3 or more per 500 grams of reactants.

PERTINENT PRIOR ART

U.S. Pat. No. 3,691,258 describes coating compositions in which the resinous binder component is a polyester resin and an aminoplast curative. The polyester comprises as the polyol component at least one aliphatic polyol having 3 to 4 hydroxyl groups such as trimethylolpropane or glycerine and one or both of ethylene glycol and 1,2-propanediol. The carboxylic acid component comprises a cyclic acid component such as phthalic acid and an acyclic acid component such as adipic acid. Polyesters described in the patent are said to have good elasticity and hardness and be resistant to yellowing. Further, the polyesters are described as being an improvement over polyesters prepared with neopentyl glycol which are described as being brittle.

Ethylene and propylene glycol introduce "soft" segment into the polyester chain which increases the flexibility and elasticity of the polymer. However, the patent acknowledges that achieving flexibility and elasticity in this manner results in poorer durability and moisture resistance because ethylene and propylene glycol introduce hydrophilic moieties into the polyester chain. In the present invention elasticity and flexibility in the polyester is achieved in another manner.

In the present invention, the esterification reaction is conducted to a very high degree such that weight average molecular weight of the polyester is very high. Such high weight average molecular weight polyesters result in flexible, elastic polyesters. In fact, in the practice of the present invention, normally brittle polyesters such as those prepared from neopentyl glycol can be prepared such that they are quite flexible while maintaining the good durability normally associated with neopentyl glycol-type polyesters.

U.S. Pat. No. 3,691,258 does not teach high weight average molecular weight polyesters as required by the present invention. In fact, the contrary appears true. In column 4, lines 18–24 of the patent, an average molecular weight between 600–3000, preferably 800–2500, and more preferably between 1000 and 2000 is stated. Although not specifically stated, number average molecular weight is probably intended. Therefore, the aforementioned portion of U.S. Pat. No. 3,691,258 indicates that the preferred polyesters have moderate rather than high average molecular weights. The polyesters of the present invention have high weight average molecular weights which, as will be shown below, are very close to a gelled material.

In addition, although there is a relationship between weight average molecular weight and number average molecular weight, the two average molecular weights cannot be correlated. The weight average molecular weight emphasizes the high molecular weight fraction of the polymer while the number average molecular weight emphasizes the low molecular weight fraction of the polymer. It is the high molecular weight fraction of the polymer, close to gelling, which is critical in making coatings of the present invention. In addition, U.S. Pat. No. 3,691,258 calculates molecular weight based on the charge ratio of reactants. A high weight average molecular weight material depends not so much on charge but on the ratio of reactants in the reaction zone at the end of reaction and on the extent of reaction.

In addition, many of the polyesters of the working examples of U.S. Pat. No. 3,691,258 appearing in Table I of the patent, due to the molar ratio of charged reactants, and assuming none of the reactants are lost, e.g., by codistillation, will have weight average molecular weights significantly below the polyesters of the present invention. With regard to the polyesters mentioned in Table I which have charge ratios in which a non-gelled high weight average molecular weight could be prepared, there is no indication in the patent that such polyesters are prepared. In fact, the contrary is true. The procedure described in the patent for making the polyesters is simple and when attempts were made to reproduce certain of the examples, either low weight average molecular weight products or gelled products were obtained.

It is very difficult to prepare high weight average molecular weight polyesters even as provided by the present invention. In preparing these polyesters, it is necessary to conduct the reaction to an extent just short of gel formation. Thus, unless special precautions are taken as described in the specification, the reaction mixture will gel or the reaction will be conducted to a point considerably short of gel formation and a relatively low weight average molecular weight polyester obtained.

Figure 1:
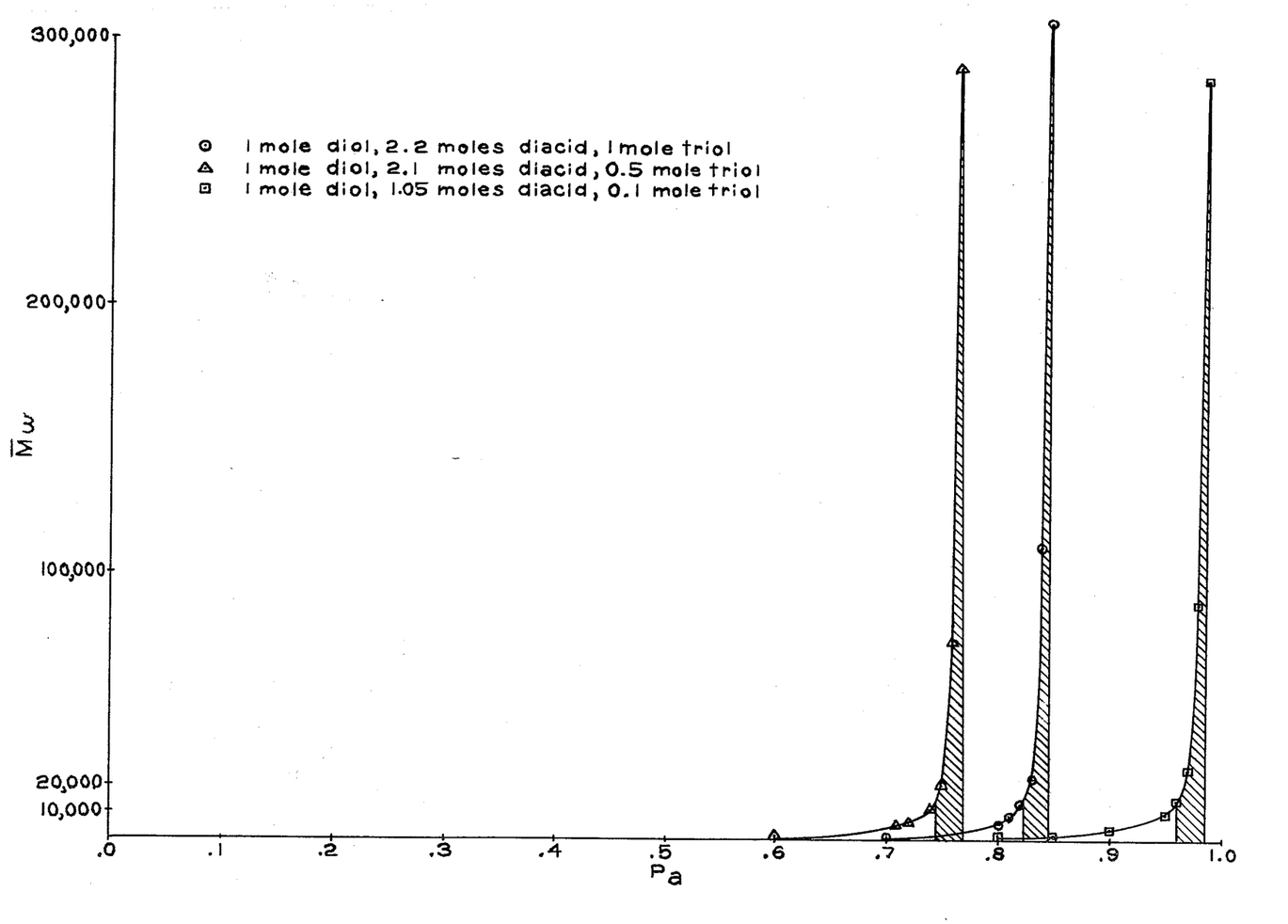
The FIGURE is a graph showing weight average molecular weight ($\overline{M}_w$) as a function of the extent of reaction ($P_A$) for three polyesters. The cross-hatched area represents the high weight average molecular weight polyesters of the invention.

The difficulty in making such high weight average molecular weight polyesters is exemplified in the FIGURE which is a plot of weight average molecular weight ($\overline{M}_w$) vs. the extent of reaction ($P_A$). The extent of reaction is based on the Stockmayer variation of the Flory equation which is described below in the specification. The graph shows the build up in weight average molecular weight of three different polyesterification reaction mixtures. The graph indicates that in order to obtain the high weight average molecular weights of the invention, the reaction must be carried out to a point very close to gelation. Further, the curves for the various reaction mixtures show that as high weight average molecular weights are approached, the slope of the curve increased dramatically indicating that for a very small increase in the extent of reaction, there is a great increase in molecular weight. Thus, the difference in extent of reaction for a product of sufficiently high weight average molecular weight and a gelled product is small being usually less than 2 percent and for preferred products less than 0.1 percent. In order to get a product reproducible to a certain molecular weight, for example, 100,000±20 percent, the difference is of the order of 0.02 percent. This is the reason why it is easy to gel the reaction mixtures and why the prior art teaches reaction to an extent considerably short of gel formation resulting in a relatively low molecular weight polymer.

DETAILED DESCRIPTION

The invention provides an ungelled, stable, hydroxyl-containing polyester of high weight average molecular weight having a controlled percentage of acyclic moieties, cyclic moieties and/or amide moieties and containing a controlled amount of polyfunctional reactants, that is, having a functionality of 3 or more.

Although the molecular weight of the polyester resins can be calculated as a number average or a weight average based on the stoichiometric ratio of the reactants, this procedure works well for polymers of low molecular weight where a small variation in the ingredients present in the reaction vessel and a small variation in the extent of reaction does not create a large discrepancy. However, when the weight average molecular weight is high, the numbers one obtains vary significantly due to small variations in the ingredients as well as the extent of reaction. Since the precise weight of the charge is not known with certainty and the extent of reaction is not known, the calculated values may not be an accurate reflection of the actual molecular weight. Thus, in order to define weight average molecular weight, gel permeation chromatography should be used. The weight average molecular weight of the polyesters of the present invention as compared to a polystyrene standard is in the range of 20,000 to about 300,000, preferably 50,000 to about 300,000 and most preferably 80,000 to 150,000. At weight average molecular weights below 50,000, elongation suffer somewhat, although good coatings not requiring outstanding elongation can be prepared. Polyesters with weight average molecular weights above 150,000 result in low sprayable solids leading to lower film builds. Examples of such coatings would be for coil use and for aluminum extrusion.

In measuring the weight average molecular weight using the polystyrene as the standard, a Waters Associates gel permation chromatograph Model 201 was used. Four $\mu$-Styragel columns were used. Each column has the dimensions of 30 centimeters long and 7.8 millimeters inside diameter. A differential refractometer was used as detector, and the columns were arranged according to their pore size on the order of $10^4$–$10^3$-500–100 Angstroms with the $10^4$ Angstrom column being the first one. Tetrahydrofuran was used as a solvent with a flow rate of 2.0 milliliters/minute. The quality of the columns is checked by their "theoretical plate number" determined from ortho-dichlorobenzene and those columns with theoretical plate numbers greater than 3000/30 cm were used.

To determine molecular weight by gel permeation chromatography (GPC), the instrument is first calibrated using a polystryene standard. Polystyrene standards used were purchased from Pressure Chemicals Company, Pittsburgh, Pa., and Waters Associates. The polystyrene standards have dispersities (dispersity=weight average molecular weight/number average molecular weight) ranging from 1.05 to 1.10. The weight average molecular weights of the polystyrene standards used were 2,000,000; 830,000; 451,000; 233,000; 110,000; 34,500; 20,000; 9,000; 4,000; 2,900. To obtain a calibration curve, a set of 1.0 percent (10 milligram polystyrene/1.0 ml tetrahydrofuran) polystryene solutions in tetrahydrofuran were prepared and a 0.2 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 2900 and the calibration curve beyond that was extrapolated down to 100. The upper and lower exclusion limits of this set of columns are 450,000 and 100, respectively, in terms of polystyrene molecular weight. The sample whose molecular weight averages are to be determined was prepared as a 1.0 percent tetrahydrofuran solution. After filtration through a 0.5 micron MILLIPORE filter, available from Millipore Corporation, Catalog No. FHLP01300, a 2.0 ml sample size was injected into the columns and a GPC chromatogram obtained under the same experimental conditions as the calibration. The chromatogram is divided into vertical segments of equal elution volume approximately one ml, and the height $(H_i)$ of each segment and the corresponding molecular weight $(M_i)$ obtained from the calibration curve are used to calculate the weight average molecular weight $(M_w)$ according to equation 1.

$$M_w = (\Sigma H_i \times M_i)/\Sigma H_i \qquad (1)$$

The high weight average molecular weight polyester (which is intended to include polyesteramides and which are formed by esterification and amide formation reactions) is prepared from reacting:
(A) 10 to 70 percent by weight of a difunctional active hydrogen component having two active hydrogens per molecule, the active hydrogens being selected from the class consisting of hydroxyl, primary amine, secondary amine, said active hydrogen component comprising:
  (1) 10 to 60 percent by weight of an acyclic diol having a carbon to oxygen ratio of at least two,
  (2) up to 60 percent by weight of a cyclic diol,
  (3) up to 20 percent by weight of a compound selected from the class consisting of diamines and hydroxyl-containing amines;
(B) 25 to 85 percent by weight of a dicarboxylic acid component comprising:
  (1) 5 to 85 percent by weight of an acyclic dicarboxylic acid containing from 2 to 36 carbon atoms,
  (2) up to 80 percent by weight of a cyclic dicarboxylic acid,
(C) up to 30 percent by weight of an active hydrogen component having at least three active hydrogens per molecule, the active hydrogens being selected from the class consisting of hydroxyl, primary amine, secondary amine and carboxylic acid;
(D) from 0 to 20 percent by weight of a difunctional amino carboxylic acid; the percentages by weight being based on total weight of (A), (B), (C) and (D).

The difunctional active hydrogen component comprises 10 to 70 and preferably 20 to 50 percent by weight of the reactants, and is made up of 10 to 60 and preferably 20 to 40 percent by weight of an acyclic diol and up to 60 percent by weight of a cyclic diol and up to 20 percent by weight of a compound selected from the class consisting of diamines and hydroxyl-containing amines.

The dicarboxylic acid component comprises 25 to 85 and preferably from 35 to 75 percent by weight of the reactants. The polycarboxylic acid component comprises from 5 to 85, preferably 10 to 30 percent by weight of an acyclic dicarboxylic acid containing from 2 to 36 carbon atoms and up to 80 percent, preferably 20 to 40 percent by weight of a cyclic dicarboxylic acid component containing from 7 to 20 carbon atoms.

Preferably, the active hydrogen component having at least three active hydrogens per molecule which are selected from the class consisting of hydroxyl, primary amine, secondary amine and carboxylic acid comprises up to 30 and preferably from 3 to 20 percent by weight of the reactants.

The acyclic diol component provides relatively soft domains in the polyester molecule, thereby contributing to the flexibility and elongation of the resultant coating prepared from the polyester. The carbon to oxygen ratio of the acyclic diol is at least 2, preferably greater than 2 so as to provide for more durable coatings. Examples of suitable acyclic diols are those containing from 2 to 12 carbon atoms such as 1,2-butanediol, 1,4-butanediol, neopentyl glycol and 1,6-hexanediol, with neopentyl glycol and 1,6-hexanediol being preferred. Acyclic polyols having carbon to oxygen ratios of less than 2 such as ethylene and propylene glycol give films which are more hydrophilic and are more moisture sensitive and do not have the outstanding durability of the preferred composition.

The difunctional active hydrogen-containing component can also contain a cyclic diol. Suitable cyclic diols are those which contain from 6 to 20 carbon atoms and examples include cycloaliphatic diols such as 1,2-cyclohexanediol, 1,4-cyclohexanediol, cyclohexane-1,2-dimethanol and cyclohexane-1,3-dimethanol and aromatic materials such as ortho-xylylene-2,2'-diol.

Suitable diols may also be ethylene and propylene oxide adducts of the above diols as well as of Bisphenol A and of Novolak resins such as the condensate of 3 moles of phenol and 2.5 moles of formaldehyde. Other diols such as poly(tetramethylene ether) glycol having a molecular weight of about 1000 can be used.

Also, in addition to the acyclic and cyclic diols described above, amide group-containing diols including polyurethane-containing diols can also be employed. Examples of these compounds which include cyclic amide group-containing diols are described in U.S. Pat. No. 3,959,201 to Chang in column 5, beginning at line 23, continuing through to column 7, line 62. Although portions of this reference disclose higher functionality polyols, that is, having functionalities greater than 2, it is the amide group-containing diols including cyclic amide group-containing diols and polyurethane diols which are intended to be utilized in the practice of the present invention.

The difunctional active hydrogen component can optionally contain a reactant selected from the class consisting of diamines and amino alcohols. The diamines which can be employed can be primary or secondary diamines containing from 2 to 20 carbon atoms in which the organic radicals attached to the nitrogen atom can be aliphatic, acyclic, aromatic, aromatic-substituted aliphatic, aliphatic-substituted aromatic or heterocyclic. Examples of suitable aliphatic and acyclic diamines are 1,2-ethylene diamine, 1,2-propylene diamine, hexamethylene diamine and 1,8-menthane diamine. Aromatic diamines such as phenylene diamines and toluene diamines may be employed. Examples would include ortho-phenylene diamine and 2,4-toluene diamine.

The amino alcohols which can be employed are those which contain one primary or secondary hydroxyl group, one primary or secondary amino group attached to an organic radical containing from 2 to 20 carbon atoms in which the organic radicals can be aliphatic, acyclic, aromatic, aromatic-substituted aliphatic, aliphatic-substituted aromatic or heterocyclic. Examples of amino alcohols include monoethanolamine and n-(hydroxyethyl) ethyl amine.

The acyclic dicarboxylic acid component functions in a similar manner as the acyclic diol component in that it provides for relatively soft domains in the polyester molecule contributing to the flexibility and elasticity of the resultant film deposited from the polyester. Examples of suitable acyclic dicarboxylic acids are succinic acid, glutaric acid, adipic acid, suberic acid and sebacic acid.

The dicarboxylic component may contain a cyclic dicarboxylic acid which may be aromatic or cycloaliphatic. Examples include phthalic acid, isophthalic acid, terephthalic acid, hydrogenated derivatives thereof such as hexahydrophthalic acid and tetrahydrophthalic acid.

For coating usage, the polyesters of the present invention are saturated, that is, they are substantially free of alpha, beta-ethylenic unsaturation, although a small amount, i.e., less than 10 percent by weight based on total weight of the polyester, may be introduced into the polyester from ingredients such as maleic and fumaric acid.

Although substantially free of alpha, beta-ethylenic unsaturation, the polyester may optionally be modified with about 0-15 percent of fatty acids or derivatives thereof which are suitable for the production of alkyd resins. Examples of such fatty acids would include tall oil fatty acid, linseed oil fatty acid, the fatty acids of soya oil, safflower oil and dehydrated castor oil.

Besides the carboxylic acids themselves, a functional acid derivative of the carboxylic acid may also be used. Examples include lower alkanol esters of the carboxylic acid such as the dimethyl and diethyl ester. Also, anhydrides of the carboxylic acids where they exist can also be used. Examples of such functional derivatives are dimethyl cyclohexane dicarboxylate, cyclohexane dicarboxylic anhydride and phthalic anhydride.

Also included among the reactants is a polyfunctional component having at least three active hydrogens per molecule; the active hydrogens being selected from the class consisting of hydroxy, primary amine, secondary amine and carboxylic acid and mixed groups. The polyfunctional reactants provide crosslinking sites in the polyester which contributes to the tensile strength, hardness and durability of the cured polyester films. Examples of such reactants include those in which the hydroxyl, amine and carboxylic acid groups are attached to aliphatic radicals containing from 3 to 30 carbon atoms. Examples of suitable components include aliphatic polyols containing from 3 to 4 hydroxyl groups which are preferred such as trimethylolpropane, trimethylolethane, pentaerythritol, and glycerine. Also, the polyfunctional component can contain in the same molecule differing reactant groups, that is, hydroxy and amine groups, hydroxyl and carboxylic acid groups and amine and carboxylic acid groups. Examples of suitable reactants include tartaric acid, aminoethanolamine, diethanolamine, dimethylolpropionic acid, malic acid, glutamic acid and N-(hydroxyethyl) ethylene diamine.

The reactants can optionally contain up to 20 percent by weight of a primary or secondary monoamino monocarboxylic acid. Examples include those compounds in which the amine and carboxylic acid groups are attached to alipatic or aromatic radicals such as aminopropionic acid, 4-aminobenzoic acid and glycine.

The cyclic moiety and the amide moiety in the polyester provide hardness and durability to the coatings prepared with the polyesters. Therefore, the weight percentages of the reactants used in preparing the polyester are adjusted such that the weight percentage of cyclic moieties (the formula weight of the ring component, e.g., plus the weight percentage of amide moieties (formula weight of the amide moiety formed in the polyester will satisfy the following equation: Weight percentage of cyclic moieties in the polyester plus weight percentage of amide moieties in the polyester multiplied by 4 is a number up to 35, preferably from 5 to 35 and more preferably 10 to 30.

Coatings prepared from polyesters having less than the required amount of cyclic and/or amide moieties are too soft for the applications contemplated by the present invention and have poor durability, whereas coatings having more than the required amount of cyclic and/or amide moieties are too brittle for the applications contemplated by the present invention.

Also, a certain amount of crosslinking is needed in the polyester molecule to develop optimum tensile strength and elongation along with hardness and durability. Crosslinking can be achieved by using reactants having a functionality of at least 3, that is, the reactants will have 3 or more hydroxyl, primary amine, secondary amine or carboxylic acid groups taken individually or in combination per molecule. Accordingly, the weight percentages of the reactants used in preparing the polyester are adjusted such that these reactants contain about 0.01 to 1.0, preferably 0.1 to 1.0 gram-mole of reactants having a functionality of 3 or more per 500 grams of reactants. Cured polyester resin films prepared with less than 0.01 gram-mole of reactants having a functionality of 3 or more per 500 grams of reactants generally have poor tensile strength and poor low temperature flexibility. On the other hand, cured polyester resin films prepared with greater than 1.0 gram-mole of reactants having a functionality of greater than 3 per 500 grams of reactants are more brittle than desired.

The polyester can be prepared by mixing the polyol and diacid components and heating the mixture to a temperature up to about 250° C. An esterification reaction catalyst such as a tin compound, for example, dibutyltin oxide and butyl stannoic acid, can be employed. A solvent may be used such as xylene or toluene to distill azeotropically with the water (or alkanol) of the reaction. The polyesterification reaction can also be conducted without azeotroping agents as, for example, by means of a fusion process in which a non-reactive gas is blown through the reaction mixture in order to remove the water.

In order to make a high molecular weight polyester in accordance with the present invention, the reaction mixture is preferably a gelling mixture of ingredients. With polyesters prepared with relatively high amounts of higher functionality reactants (i.e., having a functionality of 3 or more) and proper amounts of reactants charged, a gelling mixture is relatively certain and the viscosity will build up quite quickly as the reaction proceeds. However, polyesters prepared with relatively low amounts of higher functionality reactants do not have particularly high viscosity buildups with time and may take an inordinately long period of time to achieve high viscosities which indicate the desirable high molecular weight. Sometimes the desirable high molecular weights cannot be achieved probably due to side reaction or other reasons. Therefore, with these types of polyesters containing low amounts of higher functionality materials, it may be necessary after polyesterification has been conducted for a period of time to add some additional polyfunctional material such as a polyacid or a polyol or polyepoxide to the reaction mixture to obtain the desired gelling mixture of reactants. The choice of a polyacid or polyol will depend on the stoichiometry of the reactants. Examples of addition polyacids or polyols are those described above.

Besides polyacids, polyols and polyepoxides, other polyfunctional materials such as polyfunctional aziridine compounds could be used, although their use is not preferred.

A few general guidelines can be given with regard to the post addition of polyacids or polyols. First of all, the viscosity of the reaction mixture is related to its weight average molecular weight, the higher the weight average molecular weight, the higher the reaction mixture viscosity (at the same extent of dilution). Experience with a particular polyester will allow one to follow the change in viscosity of the reaction mixture and correlate this to the change in weight average molecular weight. This is easily accomplished by having first plotted on a graph the weight average molecular weight vs. the viscosity of the polyester. Once viscosity-molecular weight data is known, it can be said in general that if the viscosity of the reaction mixture is not building up quickly and the acid value is relatively high as compared with a standard reaction mixture, then a polyol should be added to the reaction mixture. On the other hand, if the viscosity of the reaction mixture is not building up quickly and the acid value is low, a polyacid should be added. The amount of polyacid or polyol to be post added can only be determined by experience. In general, small incremental additions should be made and the effect of each addition on the viscosity of the reaction mixture determined.

In making the high molecular weight products of the invention, the polyesterification is, of course, not conducted to a point of gelation. A gelled product (that is, one having an infinite weight average molecular weight) is not usable in the practice of the invention.

The polyesterification is, however, conducted at a relatively rapid rate to a point short of gelation. The reaction rate is then decreased and the polyesterification conducted at a slower rate until the desired molecular weight is obtained. The reaction could probably not be conducted at a relatively rapid rate until the desired molecular weight is obtained because the viscosity buildup with the extent of reaction or the time is so great that the reaction could not be monitored closely enough or to give the desired product which has a narrow molecular weight specification. In fact, it is often found that one cannot even prevent gelation. Reaction could, of course, be conducted at a slower rate from the beginning and throughout the course of the reaction, although the time involved would be prohibitively long.

As mentioned above, the polyesters of the present invention are difficult to prepare. As shown in the drawing, the reaction must be conducted to a point close to gelation. In preparing the polyesters of the present invention, the Flory equation as modified by Stockmayer can be used as a guide. The equation for calculating the weight average molecular weight ($\overline{M}_w$) is as follows:

$$\overline{M}_w = \frac{P_B \frac{\epsilon_i M_i^2 A_i}{\epsilon_i f_i A_i} + P_A \frac{\epsilon_j M_j^2 B_j}{\epsilon_j g_j B_j} + P_A P_A \frac{P_A(f_e - 1)M_B^2 + P_B(g_e - 1)M_A^2 + 2M_A M_B}{1 - P_A P_B(f_e - 1)(g_e - 1)}}{P_B \frac{\epsilon_i M_i A_i}{\epsilon_i f_i A_i} + P_A \frac{\epsilon_j M_j B_j}{\epsilon_j g_j B_j}}$$

where $A_i$=moles of $i^{th}$ acid with functionality $f_i$; $B_j$=moles of $j^{th}$ alcohol with functionality $g_j$; $M_i$=molecular weight of $i^{th}$ acid molecule; $M_j$=molecular weight $j^{th}$ alcohol molecule; $P_B$=fraction of hydroxyl group reacted, $P_A$=fraction of acid groups reacted, $M_A$, $M_B$, $f_e$ and $g_e$ defined as follows:

$$f_e = \frac{\epsilon_i f_i^2 A_i}{\epsilon_i f_i A_i} \qquad g_e = \frac{\epsilon g_i^2 B_j}{\epsilon g_i B_j}$$

$$M_A = \frac{\epsilon_i M_i f_i A_i}{\epsilon_i f_i A_i} \qquad M_B = \frac{\epsilon_j M_j g_j B_j}{\epsilon_j g_j B_j}$$

The acid number (A.N.) is approximated by the following equation:

$$A.N. = \frac{56,100 \, (\epsilon_i A_i f_i)}{\epsilon \, A_i M_i + \epsilon_j B_j M_j} \quad (1-P_A) \tag{1-$P_A$}$$

For a detailed study of the theory and principles underlying the above equations, reference is made to *Official Digest*, January 1964, pages 28–41.

The Stockmayer equation enables one to predict whether a polyesterification reaction mixture will gel. The equation takes into consideration the total moles and functionality of the polyol and polyacid component. The equation enables one to calculate, based on the amount of acid consumed, the weight average molecular weight at a degree of reaction ($P_A$). Thus, the Stockmayer equation can be used as a guide in the practice of the present invention.

For example, suppose according to the Stockmayer equation a polyesterification reaction mixture will reach a desirable weight average molecular weight within the scope of the invention at an extent of reaction of 0.75 (that is, $P_A$=0.75). The polyesterification can be conducted at a relatively rapid rate to a point short of the molecular weight desired, for example, 0.68 by monitoring the acid number. The reaction rate is then decreased and the reaction continued at a slower rate until the desired extent of reaction and molecular weight are obtained. For example, if one wishes to prepare a polyester based upon neopentyl glycol, trimethylolpropane, adipic acid and isophthalic acid with a weight average molecular weight between 20,000 and 300,000 and a triol content of 8 percent by weight, one could use 15 moles of neopentyl glycol, 3 moles of trimethylolpropane, 8.5 moles of adipic acid and 9 moles of isophthalic acid. The Stockmayer equation predicts that the reaction must be carried out to between 93.55 and 95.07 percent completion ($P_A = 93.94 - 95.07$). This corresponds to an acid value range of 25.3–20.6. Above an acid value of 25.3, the molecular weight is less than 20,000. At an acid value lower than 20.6, the resin would be a gel. Special precautions are necessary in order to obtain a product with such narrow acid value limits.

For the most preferred polyesters, that is, those with weight average molecular weights between 80,000 and 150,000, the acid number limits are quite narrow. In the example given above, the $P_A$ values are 0.9485 to 0.9499 and the acid number limits are 21.5 to 20.9. To simply charge a reaction vessel and react to this acid number and hope to attain the proper weight average molecular weight would be impossible. If the glycol is mischarged by only one percent or lost in any other way (codistillation, intra or intermolecular dehydration), the reaction would get at these acid number limits.

The following table shows a series of calculations based on the Flory equation for determining the extent of reactions and acid numbers for a series of polyesters based on various mole ratios of diol, diacid and triol. It is assumed the molecular weight of the ingredients is 200.

for $P_A = 80,000$ and $P_A = 150,000$. Thus, the specification window shows the criticality involved in attaining the high molecular weight products of the invention. The specification window is shown graphically by the drawing in the crosshatched areas.

The Stockmayer prediction is based upon the assumptions that (a) all materials are dry and rigorously pure, (b) there is exact weighing, (c) no side reactions take place, (d) no glycol loss occurs from the refluxing condenser through which water is removed, and (e) there is equal reactivity of functional groups. These assumptions are most always not valid. Water and/or other impurities are invariably present in starting materials and weighings may not always be exact. Glycols undergo many side reactions such as inter and intramolecular dehydration to form ethers, alkenes and aldehydes. Also, glycols will invariably codistill with water from the condenser. If in the above example due to various reasons neopentyl glycol is short by 5 percent, the reaction cannot be carried out to an acid value of 26 without gelation. The reaction must be carried out to a percentage completion of 91.39 to 92.88 percent and the acid value of the product must be from 36.6 to 30.3 in order to get a product having a weight average molecular weight within the range of 20,000 to 300,000.

However, even with the non-ideal conditions in an actual polyesterification, the Stockmayer equation can be used as a rough guide in preparing and defining polyesters having high molecular weights within the scope of the invention. Thus, in accordance with the present invention, the polyesterification is conducted at a relatively rapid rate until at least about 60 percent and more usually between 60 and 90 percent of the extent of reaction corresponding to the desired weight average molecular weight. For the minimum weight average molecular weight of 20,000, this is defined as $P_A/P_{20,000}$ = at least 0.60. When the reaction reaches this stage, the reaction rate is lowered and the reaction is conducted at a lower rate until the desired high molecular weight product is obtained.

Table

Calculations Based on Stockmayer Equation for a Series of Polyester Reactants

| Moles Diol | Moles Diacid | Moles Triol | $\overline{M}_w = 20,000$ | | | $\overline{M}_w = 300,000$ | | | $P_A$ Window for $\overline{M}_w = $ 20,000–300,000 | $P_A$ Window for $\overline{M}_w = $ 80,000–150,000 |
|---|---|---|---|---|---|---|---|---|---|---|
| | | | $P_A$ | Acid Number | Hydroxyl Value | $P_A$ | Acid Number | Hydroxyl Value | | |
| 1 | 3 | 1 | .7090 | 97.75 | 41.85 | .7208 | 93.97 | 37.87 | 0.0118 | 0.0015 |
| 1 | 2.9 | 1 | .7210 | 92.63 | 46.84 | .7332 | 88.58 | 42.78 | 0.0122 | 0.0015 |
| 1 | 2.8 | 1 | .7340 | 87.04 | 51.97 | .7462 | 83.05 | 47.99 | 0.0122 | 0.0016 |
| 1 | 2.6 | 1 | .7615 | 75.62 | 63.42 | .7743 | 71.56 | 59.37 | 0.0128 | 0.0016 |
| 1 | 2.4 | 1 | .7925 | 63.49 | 76.25 | .8080 | 59.36 | 72.11 | 0.0155 | 0.0017 |
| 1 | 2.2 | 1 | .8280 | 50.54 | 90.61 | .8418 | 46.48 | 86.56 | 0.0138 | 0.0018 |
| 1 | 2.0 | 1 | .8684 | 36.91 | 107.04 | .8828 | 32.87 | 103.00 | 0.0144 | 0.0018 |
| 1 | 1.8 | 1 | .9154 | 22.48 | 125.82 | .9306 | 18.44 | 121.78 | 0.0152 | 0.0019 |
| 1 | 1.6 | 1 | .9710 | 7.23 | 147.48 | .9871 | 3.22 | 143.46 | 0.0161 | 0.0020 |
| 1 | 1.4 | 1 | — | — | — | — | — | — | — | — |
| 1 | 2.8 | 0.5 | — | — | — | — | — | — | — | — |
| 1 | 2.6 | 0.5 | — | — | — | — | — | — | — | — |
| 1 | 2.4 | 0.5 | .7016 | 103.01 | 9.51 | .7136 | 98.91 | 5.41 | 0.0120 | 0.0015 |
| 1 | 2.2 | 0.5 | .7328 | 89.13 | 20.90 | .7453 | 84.96 | 16.73 | 0.0125 | 0.0016 |
| 1 | 2.0 | 0.5 | .7685 | 74.21 | 34.14 | .7817 | 69.98 | 29.91 | 0.0132 | 0.0016 |
| 1 | 1.8 | 0.5 | .8101 | 58.11 | 49.61 | .82395 | 53.87 | 45.37 | 0.0139 | 0.0018 |
| 1 | 1.6 | 0.5 | .8593 | 40.37 | 67.88 | .87394 | 36.50 | 63.65 | 0.0146 | 0.0019 |
| 1 | 1.4 | 0.5 | .9187 | 22.02 | 89.73 | .9343 | 17.79 | 85.50 | 0.0156 | 0.0020 |
| 1 | 1.2 | 0.5 | .9924 | 1.89 | 116.17 | — | — | — | — | — |
| 1 | 1.0 | 0.5 | — | — | — | — | — | — | — | — |
| 1 | 1.3 | 0.1 | .8678 | 40.17 | 5.10 | .8835 | 35.40 | 0.33 | 0.0157 | 0.0020 |
| 1 | 1.2 | 0.1 | .9032 | 28.33 | 16.13 | .9195 | 23.56 | 11.36 | 0.0163 | 0.0021 |
| 1 | 1.1 | 0.1 | .9434 | 15.88 | 28.62 | .9604 | 11.11 | 23.85 | 0.0170 | 0.0021 |
| 1 | 1.0 | 0.1 | .9895 | 2.80 | 42.87 | — | — | — | — | — |
| 1 | 0.9 | 0.1 | — | — | — | — | — | — | — | — |

The "window" shown in the above table is the difference in the extent of reaction between the lower limit of the invention, that is, $P_A = 20,000$ and $P_A = 300,000$, and Polyesters are usually prepared at a temperature of about 200°–220° C. without solvent or with a small amount of solvent such as xylene to carry out water formed during the reaction. The reaction is carried out without external pressure. The reaction rate under these conditions is usually fast. It is too fast and is often not practical for approaching the molecular weight of the resins described in the present invention. At best, the product will be inconsistent in molecular weight and at worst, there will be many batch failures. Many batches will gel which often necessitates digging out the reaction vessel with chisels and hammers. Consequently, the reaction must be slowed down near the end of the reaction period which is usually determined by the acid value or the amount of water removed from the reaction mixture.

In order to slow down the reaction, there are several choices. One, the reaction temperature can be lowered. However, if the reaction temperature is lowered without other mitigating factors such as the addition of solvent, the viscosity of the resin will be too high to handle properly. Merely lowering the reaction temperature results in a resin which will be so viscous it actually cannot be stirred properly. It should be mentioned, however, that some polyesterification reaction mixtures such as those based on phthalic anhydride sometimes can be lowered in temperature and the reactants will still have sufficient fluidity to be processed without modifying the reaction mixture such as the addition of solvent.

The reaction rate can be lowered while maintaining the high reaction temperature by adding chemicals to deactivate the catalyst present in the polyesterification. For example, if acid catalyst is used, the catalyst may be neutralized with caustic or deactivated with complexing agents. The difficulties of this approach are that the agents added to the batch to deactivate the catalyst will contaminate the batch and its removal can be difficult.

As indicated above, the reaction rate can be slowed by lowering the reaction temperature. To compensate for the viscosity of the resin, a considerable amount of low boiling solvent such as xylene may be added to the reaction mixture to make it more fluid at the relatively low reaction temperatures which may be as low as 150° C. Problems with adding low boiling solvents are that the solvent must be eventually removed and addition of this much solvent results in low resin productivity per reaction kettle.

Instead of adding a considerable amount of low boiling solvent, a relatively small amount of low boiling solvent such as xylene may be added to the reaction mixture and the reaction conducted at a lower but still relatively high temperature of about 180° C. The reaction vessel is pressurized to prevent evaporation of the low boiling solvent. Thus, the resin will not be highly viscous due to the combination of low boiling solvent and lower, although still relatively high, reaction temperature. The difficulty with this approach is that high pressure reaction vessels are expensive and require special skills. In addition, removal of water and return of solvent is often difficult under pressure. With a reaction vessel under pressure, it is often difficult to remove a sample from the reaction vessel for determination of its viscosity and molecular weight and especially difficult to add the correct amounts of ingredients to get the desirable products.

Finally, the reaction rate can be lowered by lowering the temperature and adding a limited amount of a high boiling solvent such as about 5–20 percent by weight of a high boiling solvent such as diisoamylketone. Thus, the reaction can be carried out at a relatively high temperature, for example, 180° C., and at a relatively low viscosity with no external pressure having to be applied. This method is the preferred method of lowering the reaction rate.

In making good elastomeric coating compositions, the high molecular weight polyester described above is mixed with a curing agent to provide the major resinous component binder of the coating composition. The curing agent is one which is capable of reacting with the hydroxy or carboxylic acid groups of the polyester to form a crosslinked product. Examples of suitable curing agents are polyfunctional isocyanates including blocked isocyanates, polyepoxides and amine-aldehyde condensates which are preferred. Because of subsequent curing, the polyester should contain sufficient functional groups such as hydroxyl and carboxylic acid groups to react with the curing agent to form a cured product. Hydroxyl groups are preferred for curing and acid groups are desirable for water solubilization. The hydroxyl value of the polyester should be about 10 to 160 and preferably 40 to 100. Preferably, the acid number should be less than 50 for good humidity resistance in the final coating. For water solubility, the acid value should be about 20 to 40.

The high molecular weight polyesters of the present invention in combination with aminoplast provide stable one-package curable systems which, when cured, provide excellent elastomeric coatings. Amine-aldehyde condensates obtained from the reaction of formaldehyde with melamine, urea or benzoguanamine are most common and are preferred in the practice of the invention. However, condensates with other amines and amides can be employed, for example, aldehyde condensates of diazines, triazoles, guanidines, guanamines and alkyl and aryl di-substituted derivatives of such compounds including alkyl and aryl substituted ureas and alkyl and aryl substituted melamines and benzoguanamines. Some examples of such compounds are N,N-dimethylurea, N-phenylurea, dicyandiamine, formoguanamine, acetoguanamine, 6-methyl-2,4-diamino-1,3,5-triazine, 3,5-diaminotriazole, triaminopyrimidine, 2,4,6-triethyl triamine-1,3,5-triazine and the like.

While the aldehyde employed is most often formaldehyde, other aldehydes such as acetaldehyde, crotonaldehyde, benzaldehyde and furfural may be used.

The aminoplast contains methylol or similar alkylol groups, and in most instances, at least a portion of these alkylol groups are etherified by reaction with an alcohol to provide organic solvent-soluble resins. Any monohydric alcohol can be employed for this purpose, including such alcohols as methanol, ethanol, butanol, and hexanol, as well as arylalkyl alcohols such as benzyl alcohol, cyclic aliphatic alcohols such as cyclohexanol, monoethers of glycols such as CELLOSOLVES and CARBITOLS and halogen substituted alcohols such as 3-chloropropanol.

Preferably, the aminoplast condensate contains methylol or similar alkylol groups. These materials are preferred in the practice of the invention. Aminoplasts which are completely alkylated can be used in the practice of the invention, although their use is not preferred. If they are used, reaction temperatures must be sufficiently high, that is, about 250° F. (121° C.) or sufficient catalyst present to insure the production of a suitable product. Example of a suitable catalyst is para-toluenesulfonic acid.

The high molecular weight polyesters may also be cured with suitable polyfunctional isocyanates including blocked isocyanate. Examples of suitable polyfunctional isocyanates include monomeric polyisocyanates such as toluene diisocyanate and 4,4'-methylene-bis(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commercially available from Bayer as DE-SMODUR N. Examples of suitable blocking agents are those materials which would unblock at elevated temperatures such as low aliphatic alcohols such as methanol, oximes such as methyl ethyl ketone oxime and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application. As mentioned above, the polyester for this use must be formulated such that the hydroxyl content is sufficiently high to provide adequate crosslinking for good film strength. Examples 5-7 and 12 infra are examples of polyesters for this use.

It is necessary that the curing agent and the polyester polyol be reactive and compatible with one another. By reactive is meant that when the resinous composition is applied as a coating to a substrate, it will undergo a chemical reaction at room or elevated temperature, optionally in the presence of catalyst to form a thermoset coating which is hard, durable, flexible, solvent-resistant and elastomeric in nature. By compatible is meant that upon mixing the curing agent and polyester, a uniform mixture is obtained. The mixture can be clear or cloudy, but a two-layer phase-separated system cannot be employed in the practice of the invention. Compatibility is important from the point of view of obtaining cured films. When it is desired to obtain clear films, clear mixtures are desirable. With pigmented films of low gloss, compatibility is not that much of a problem and cloudy mixtures can be tolerated.

The weight ratio of curing agent to polyester can vary between 20 to 95 percent by weight polyester and 80 to 5 percent by weight curing agent. Preferably, the ratio should be about 60 to 80 percent by weight polyester and 40 to 20 percent by weight curing agent, the percentages by weight being based on total weight of curing agent and polyester.

Besides the resinous binder, the coating composition usually also contains a pigment and a liquid diluent for the resin. The pigments may be any of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the present invention, pigment-to-resin weight ratios can be as high as 2:1 and for most pigmented coatings, are usually within the range of about 0.05 to 1:1.

For coating applications, a liquid diluent is usually present in the composition. By liquid diluent is meant a solvent or a non-solvent which is volatile and is removed after the coating is applied and is needed to reduce viscosity sufficiently to enable forces available in simple coating techniques, that is, brushing and spraying, to spread the coating to controllable, desired and uniform thicknesses. Also, diluents assist in substrate wetting, resinous component compatibility and coalescence or film formation. Generally, a diluent is present in the composition in amounts of 20 to 90, preferably 50 to 80 percent by weight, based on total weight of the diluent and resinous component, although more diluent may be employed depending on the particular coating application. Examples of suitable liquid diluents include aromatic hydrocarbons such as toluene and xylene, ketones such as methyl ethyl ketone and methyl isobutyl ketone, alcohols, such as isopropyl alcohol, normal butyl alcohol, monoethyl ethers of glycols such as the CELLOSOLVES and CARBITOLS, water and compatible mixtures thereof. In addition, the coating composition can contain high boiling solvents which are introduced in the process of making the polyester such as described above.

When water is employed as a diluent either alone or in admixture with water-miscible solvents, the compositions of the invention can be modified so that they are dispersible in aqueous diluent. This can be accomplished by the use of externally added emulsifier or by incorporating water-solubilizing groups such as ethylene oxide moieties or ionic salt groups into the polyester. Examples of suitable ionic salt groups are The ionic salt groups can be incorporated into the components of the coating composition by techniques well known in the art. They may be present in the polyester polyol, the amine-aldehyde condensate or in both. For example, the polyester can be prepared with unreacted acid groups which can then be neutralized with dimethyl ethanolamine to form acid salt groups.

In addition to the above ingredients, various fillers, plasticizers, anti-oxidants, ultraviolet light absorbers, flow control agents, surfactants and other formulating additives can be employed if desired. These materials are optional and generally constitute up to 30 percent by weight of the coating composition based on total solids.

The coating compositions of the invention can be applied by conventional methods including brushing, dipping, flow coating, etc., but they are most often applied by spraying. Usual spray techniques and equipment can be utilized. They can be applied virtually over any substrate including wood, metal, glass, cloth, leather, plastics, foam and the like, as well as over various primers. The coatings are particularly useful on resilient and rubbery substrates such as foam rubber, polyurethane foam, and vinyl foam and on soft metal surfaces such as mild steel and aluminum. In general, the coating thickness will vary somewhat depending upon the application desired. In general, coatings from about 0.1 to 10 mils can be applied and coatings from about 0.1 to 5 mils have been found to be particularly useful in the practice of the invention.

The polyesters of the present invention can also be used in combination with other resinous materials such as unsaturated polyesters, thermosetting acrylics and UV curable resinous systems.

After application to a substrate, the coatings are cured. Curing can be at room temperature and up to 500° F. (260° C.). In most cases, the cure schedule is from about 5 to 60 minutes at 140°-260° F. (60°-127° C.). Higher or lower temperatures with corresponding shorter or longer times can be utilized, although the exact cure schedule best employed depends upon the nature of the substrate as well as the particular components of the composition. As mentioned above, certain polyfunctional isocyanates cure at room temperature, whereas amine-aldehyde condensates require higher reaction temperatures. Acid catalysts and other curing agents can be added to aid in curing if desired; these can permit the use of lower temperatures and/or shorter times.

Coating compositions prepared with the polyesters of the prsent invention exhibit many desirable properties. As mentioned above, because of the molecular weight of the polyester, the coating compositions have good sprayability and pigment dispersibility. In addition, cured coatings deposited from the resinous compositions of the invention are solvent-resistant and have outstanding elastomeric properties, hardness and durability, a combination of properties not usually associated with one another.

The sprayability of a resinous material is defined as the maximum concentration of resin solids in solution such that the resinous solution can be atomized sufficiently to form a uniformly deposited coating. Above the maximum concentration, the spraying solution strings and gives a web-like spray pattern. Sprayabilities are determined using an air suction spray gun operating at 60 psi with a No. 30 air cap. Sprayability must be high enough to get reasonable film builds in short periods of time. Yet, if the sprayability is too high, coatings prepared from the resin will have poor metallic pigment control. In general, the polyesters of the present invention (plus curing agent) have sprayabilities within the range of 15 to 30 percent and usually 22 to 26 percent which is a particularly desirable level for film build and for properly orienting metallic pigment to give lustrous metallic colors. Conventional polyesters for coating applications have much higher sprayabilities and do not give good metallic pigment control.

Solvent resistance can be determined by measuring the resistance of the cured coatings to acetone, a very good solvent for polyesters. Resistance to acetone can be determined by using the so-called "acetone wipe test". In this test, a cured coating is wiped, using hand pressure, (i.e., about 10 pounds per square inch) with an acetone-saturated cloth. The number of double rubs required to dissolve and remove the coating from the substrate is then recorded. Usually after 25 double rubs, the test is terminated and the coating evaluated. The cured coatings of the present invention can withstand 25 double rubs without being dissolved and removed from the substrate.

The elastomeric behavior of the coating compositions of the present invention can be determined by measuring the tensile strength, elongation and flexibility of the coating, particularly the low temperature flexibility of the coating over an elastomeric substrate. The tensile strength and percent elongation of the coatings is determined according to ASTM D639-72 on free films of the cured polyester. Accordingly, coatings deposited from the resinous compositions of the present invention have tensile strengths within the range of 500 to 10,000 psi and elongations of at least 25, preferably at least 50, and most preferably from 75 to 200 percent. The flexibility of the coating can be determined by coating an elastomeric substrate such as a ⅛ inch thick thermoplastic polyurethane commercially available from Mobay Company as TEXIN 3202 and bending the coated substrate around a ½ inch diameter (1.13 cm) mandrel with the coating side outwardly facing. After bending, the coating is examined for breaks and cracks. The low temperature flexibility is determined in a similar manner but the coated substrate is cooled to 0° C. before bending. When formulated for automotive use on elastomeric parts, the coatings of the present invention exhibit no breaks or cracks when treated in the above manner.

The hardness of the coating can be determined by the Sward method using a Sward rocker as described in *Organic Coatings Technology*, Payne, Vol. 1, 1965, pages 642–643. Cured coatings of the present invention usually have Sward hardness values within the range of about 4 to 65, preferably 12 to 65 for outdoor uses.

Also, for outdoor use, such as elastomeric coatings for automobiles, the exterior durability of the coatings is important.

The durability of the coatings can be determined by measuring the UV light stability and hydrolytic stability of the coatings. For example, coatings of the present invention formulated for automotive use are equal to or better than hard, inflexible, acrylic enamels or lacquers presently used. Coatings of the present invention show no visual change upon Weather-O-Meter ® exposure after at least 1000 hours. The Weather-O-Meter exposures are conducted according to ASTM D-1499-64. The exposure device is a Weather-O-Meter Type XWWR from Atlas Electric Devices Company. The type of UV light source is a single carbon arc lamp enclosed in a fused silica globe. The operating black panel temperature is 140° F. (60° C.), the spray water is deionized water at a temperature of about 70° F. (21° C.), the number and type of water spray nozzles which are used are Ford No. 50 nozzles.

Besides Weather-O-Meter exposure, hydrolytic stability can also be determined by measuring the humidity resistance of the coating. Humidity resistance of the coating can be determined by using a coated metal substrate as the ceiling of a humidity chamber (QCT chamber) with the coating directed inwardly towards the chamber. The chamber is heated to 140° F. (60° C.) and about a 2 inch (9 cm) level of water is located 3 to 5 inches below the coated panel (panel sloped). The coating, after being subjected to these conditions for 24 hours, shows no blistering nor loss of gloss.

The combination of outstanding properties of the coating compositions of the present invention make them usable for a wide variety of applications. They can be used for coating automotive parts such as automobile bodies and truck cabs, for coating appliance parts such as refrigerators and washing machines and they can also be used for coil coating applications.

The following examples illustrate the invention. All quantities are on a weight basis unless otherwise indicated.

EXAMPLE 1

The following example shows the preparation of a high molecular weight saturated polyester by esterifying neopentyl glycol, trimethylolpropane, adipic acid and isophthalic acid. The esterification was initially conducted at a relatively fast reaction rate until $P_A/P_{A\ 15,000}$ of 0.985 was obtained. Sufficient additional adipic acid was then added to form a gelling reaction mixture and the esterification was then continued at a slower rate until a polyester having a weight average molecular weight of about 87,000 was obtained.

The initial charge for preparing the polyester was as follows:

| Ingredient | Parts by Weight |
| --- | --- |
| neopentyl glycol | 6342.0 |
| trimethylolpropane[1] | 1101.6 |
| adipic acid | 3609.1 |
| isophthalic acid[2] | 6160.5 |
| dibutyltin oxide | 5.0 |
| deionized water | 500.0 |

[1]0.24 gram-mole of trimethylolpropane per 500 grams of resin.
[2]Weight percentage of cyclic moieties was 16.38.

The ingredients were charged to a reaction vessel equipped with a condenser, thermometer and inert gas purge. The reactants were heated over the period of about 7½ hours to 225° C. and about 2774 parts of water of condensation being removed. At this stage of the reaction, the viscosity of the reactants was low, that is, a Gardner-Holdt viscosity of Q at 65 percent solids in methyl isobutyl ketone, and the acid value was low, that is, about 6-10.

To 1835 parts of the reaction mixture were added 56 parts of adipic acid and 210 parts of diisoamyl ketone. Reaction was conducted at about 190° C. for about 3½ hours and the reaction mixture cooled to 170° C. and reaction continued at this temperature for an additional four hours until a Gardner-Holdt viscosity of W+ at 55 percent solids in methyl isobutyl ketone was obtained.

The resultant polyester had an acid value of about 1.73, a hydroxyl value of 30.5, a weight average molecular weight of 87,034, and a sprayability of 21 percent. Eighty (80) percent by weight of the polyester based on weight of resin solids was combined with 20 percent by weight of an amine-aldehyde curing agent (CYMEL 325) and the combination spray deposited on an elastomeric polyurethane substrate and cured at 250° F. (121° C.) for 30 minutes to give a film having a thickness of 1.5-2.5 mils and which had an elongation of 126 percent and a tensile strength of 3660 psi.

EXAMPLE 2

A polyester similar to that of Example 1 was prepared with the exception that glycerine was used in place of trimethylolpropane. The esterification was initially conducted at a relatively fast reaction rate until $P_A/P_{A\ 15,000}$ of 0.990 was obtained. Sufficient additional adipic acid was then added to form a gelling reaction mixture and the esterification was then continued at a slower rate until a polyester having a weight average molecular weight of about 86,000 was obtained. The initial charge for preparing the polyester was as follows:

| Ingredient | Parts by Weight |
| --- | --- |
| neopentyl glycol | 1396 |
| glycerine[1] | 167.2 |
| adipic acid | 795.3 |
| isophthalic acid[2] | 1355.2 |
| dibutyltin oxide | 1.23 |
| deionized water | 180.0 |

[1]0.24 gram-mole of glycerine per 500 grams of resin.
[2]Weight percentage of cyclic moieties was 16.7 percent.

The ingredients were charged to a reaction vessel as described in Example 1, heated over the period of about 32 hours to 200° C. with the evolution of about 582 parts by weight of water. At this point, the reaction mixture had a Gardner-Holdt viscosity of G measured at 60 percent solids in methyl isobutyl ketone and had an acid value of 5.6.

The reaction mixture was cooled to room temperature and 2200 parts by weight of the reaction mixture combined with 80.3 parts by weight of adipic acid and 254 parts by weight of diisoamyl ketone. The reaction mixture was then heated to 170° C. for about 20 hours until a Gardner-Holdt viscosity at 55 percent solids of U-V was reached. This corresponded to a weight average molecular weight of about 86,000. The resultant polyester had an acid value of 1.42, an OH value of 30.5, contained 55 percent by weight total solids and a sprayability of about 21 percent. When cured with CYMEL 325 as described in Example 1, the film had an elongation of 155 percent, a tensile strength of 3860 psi and a Sward hardness of 40.

EXAMPLE 3

A polyester similar to that of Example 1 was prepared with the exception that 1,6-hexanediol was used in place of neopentyl glycol. The initial charge for preparing the polyester was as follows:

| Ingredient | Parts by Weight |
| --- | --- |
| 1,6-hexanediol | 5612 |
| trimethylolpropane[1] | 3536 |
| adipic acid | 3856 |
| isophthalic acid[2] | 6568 |

[1]0.67 gram-mole of trimethylolpropane per 500 grams of resin.
[2]Weight percentage of cyclic moieties was 15.36.

The ingredients were charged to a reaction vessel such as described in Example 1 and heated over the period of about 15 hours to 205° C. with the evolution of about 2260 parts water. At this stage of the reaction, the viscosity of the reaction mixture was low, that is, a Gardner-Holdt viscosity of I⁻ at 60 percent solids in methyl isobutyl ketone, and the acid value was low, that is, about 10.6.

The reaction mixture was cooled to room temperature and 4140 parts by weight of the reaction mixture combined with 108 parts of adipic acid and 471 parts of diisoamyl ketone to form a gelling reaction mixture and the reaction mixture heated to 154° C. for about 5 hours. The reaction mixture was then cooled to room temperature, heated to 170° C. for about two hours and then 190° C. for about one hour and 45 minutes until a Gardner-Holdt viscosity of Y-Z at 65 percent solids in methyl isobutyl ketone was obtained. The reaction mixture was then cooled to room temperature.

The resultant polyester had an acid value of 4.85, a hydroxyl value of about 77, a weight average molecular weight of 105,798, and a sprayability of about 17 percent. When cured with CYMEL 325 as described in Example 1, the film had an elongation of 80 percent, a tensile strength of 1050 psi and a Sward hardness of 12.

EXAMPLE 4

The following example shows the preparation of a high molecular weight saturated polyester from neopentyl glycol, trimethylolpropane, adipic acid and terephthalic acid. The charge for preparing the polyester was as follows:

| Ingredient | Parts by Weight |
|---|---|
| neopentyl glycol | 1054 |
| trimethylolpropane[1] | 184 |
| adipic acid | 601 |
| terephthalic acid[2] | 1024 |
| dibutyltin oxide | 1.40 |
| deionized water | 100 |

[1] 0.24 gram-mole of trimethylolpropane per 500 grams of resin.
[2] Weight percentage of cyclic moieties was 16.37.

The ingredients were charged to a reaction vessel as described in Example 1 and heated to about 220° C. for 13 hours until the Gardner-Holdt viscosity of $Z^{7-}$ measured as a 67 percent solids in methyl isobutyl ketone was obtained. The resultant polyester as 67 percent solids in methyl isobutyl ketone had an acid value of 3.45 and a hydroxyl value of 65.2. The polyester had a sprayability of 17 percent and a weight average molecular weight of 62,334. When cured with CYMEL 325 as described in Example 1, the film had an elongation of 40 percent, a tensile strength of 5120 psi and a Sward hardness of 38.

EXAMPLE 5

The following shows the preparation of a high molecular weight polyester from neopentyl glycol, trimethylolpropane, sebacic acid and isophthalic acid. The charge for preparing the polyester is as follows:

| Ingredient | Parts by Weight |
|---|---|
| neopentyl glycol | 936.4 |
| trimethylolpropane[1] | 668.5 |
| sebacic acid | 1006.8 |
| isophthalic acid[2] | 1241.8 |

[1] 0.65 gram-mole of trimethylolpropane per 500 grams of resin.
[2] Weight percentage of cyclic moieties was 15.14.

The ingredients were charged to a reaction vessel as described in Example 1 and heated to about 220° C. for about 8 hours with the evolution of 440 parts water. At this stage of the reaction, the polyester had an acid number of 5.5, a hydroxyl value of 76 and a Gardner-Holdt viscosity of $V^-$ at 63 percent solids in methyl isobutyl ketone.

The reaction mixture was cooled to room temperature and 2210 parts by weight of the reaction mixture combined with 71.5 parts by weight sebacic acid and 570 parts by weight of diisoamyl ketone. The reaction mixture was then heated to 170° C. for about 17 hours until a Gardner-Holdt viscosity at 55 percent solids of X-Y was reached. This corresponded to a weight average molecular weight of 266,433. The acid value of 4.72 and hydroxyl value was 53.5 at 55 percent total solids in methyl isobutyl ketone and had a sprayability of 20 percent. When cured with 25 percent CYMEL 325 as described in Example 1, the film had an elongation of 55 percent, a tensile strength of 4479 psi and a Sward hardness of 24.

EXAMPLE 6

The following describes the preparation of a high molecular weight polyester with a high level of triol (15 percent trimethylolpropane) in order to obtain a harder film for use with polyisocyanate curing agent. The initial charge for preparing the polyester is as follows:

| Ingredient | Parts by Weight |
|---|---|
| neopentyl glycol | 2740 |
| trimethylolpropane[1] | 1304 |
| adipic acid | 1879 |
| isophthalic acid[2] | 3209 |

[1] 0.53 gram-mole of trimethylolpropane per 500 grams of resin.
[2] Weight percentage of cyclic moieties was 16.08.

The ingredients were charged to a reaction vessel as described in Example 1 and heated at 200° C. until 1150 ml of water was removed and the acid value was less than 10. To 552 parts of this resin were added 9.5 parts of adipic acid and 61 parts of diisoamyl ketone. The reaction was then conducted at 180° C. until a Gardner-Holdt viscosity of $Z-1^+$ at 55 percent solids solution in methyl isobutyl ketone was obtained. The polyester at 55 percent solids had an acid value of 1.70, a hydroxyl value of 75. The polyester had a sprayability of less than 15 percent and a weight average molecular weight of 263,307. When cured with CYMEL 325 as described in Example 1, the film had an elongation of 15 percent, a tensile strength of 5320 psi and a Sward hardness of 70.

EXAMPLE 7

The following shows the preparation of a high molecular weight water-based polyester. The initial charge for preparing the polyester is as follows:

| Ingredient | Parts by Weight |
|---|---|
| neopentyl glycol | 6336.8 |
| trimethylolpropane[1] | 1100.8 |
| adipic acid | 3606.4 |
| isophthalic acid[2] | 6156 |
| dibutyltin oxide | 4.96 |
| deionized water | 560 |

[1] 0.24 gram-mole of trimethylolpropane per 500 grams of resin.
[2] Weight percentage cyclic moieties was 16.38.

The ingredients were charged to a reaction vessel as described in Example 1 and heated to about 150°–180° C. for 13½ hours and from 185°–200° C. for about 6 hours until the acid value was about 25 and 2800 ml of water had been removed. To 8000 parts of this resin was added 485 parts adipic acid and 942 parts SULFOLANE (tetrahydrothiophene-1,1-dioxide). The reaction was conducted at about 190° C. for 5 hours and 170° C. for 3¼ hours until the viscosity was Z-4–Z-5 at 65 percent solids in methyl isobutyl ketone. The polyester had a weight average molecular weight of about 90,000. To the cooled resin (160° C.) was added 2973 parts N-methylpyrrolidinone and 230 parts dimethyl ethanolamine. The resin was further cooled to 80° C. and 13,858 parts of water added to give a stable dispersion.

EXAMPLE 8

A polyester was prepared similar to Example 1 except that the post addition used maleic anhydride (5.3 percent by weight based on total weight of polyester) to provide some unsaturation. The initial charge for preparing the polyester was as follows:

| Ingredient | Parts by Weight |
|---|---|
| neopentyl glycol | 4178.3 |
| trimethylolpropane[1] | 306 |
| adipic acid | 2147.5 |
| isophthalic acid[2] | 3660 |
| dibutyltin oxide | 2.25 |

[1] 0.105 gram-mole of trimethylolpropane per 500 grams of resin.
[2] Weight percentage of cyclic moieties was 16.28.

The ingredients were charged to the reaction vessel as described in Example 1 and heated over a period of 15 hours to 210° C. with the evolution of 2260 parts water. At this stage of the reaction, the viscosity was low (Gardner-Holdt viscosity of G at 65 percent solids in methyl isobutyl ketone) and the acid number was low, that is, 9.7.

To 2200 grams of the reaction mixture were added 117 parts of maleic anhydride and 11 parts of adipic acid. The reaction was heated for 7 hours at 210° C. and 4 hours at 170° C. until the viscosity was Z-2⁻ at 65 percent solids in methyl isobutyl ketone. The acid value of the resin was 9.75 at 60 percent solids in styrene. The weight average molecular weight of the polyester was 55,000.

EXAMPLE 9

A polyester was prepared similar to Example 1 except that dimethyl cyclohexane dicarboxylate was used in place of adipic acid and isophthalic acid. The charge for preparing the polyester is as follows:

| Ingredient | Parts by Weight |
|---|---|
| neopentyl glycol | 1294.4 |
| trimethylolpropane[1] | 222.0 |
| dimethyl cyclohexane dicarboxylate[2] | 2485.5 |
| dibutyltin oxide | 4.0 |

[1] 0.206 gram-mole of trimethylolpropane per 500 grams of resin.
[2] Weight percentage of cyclic moieties was 25.45.

The ingredients were charged to the reaction vessel as described in Example 1 and heated to 180° C. for 20 hours with the removal of 750 parts methanol. Since acid number was low and viscosity was low, that is, acid value of 11.9 and Gardner-Holdt viscosity of G+ as a 65 percent solids in methyl isobutyl ketone, 182 parts of adipic acid and 265 parts diisoamyl ketone were added to 2200 parts of the above polyester. The reaction mixture was heated at 190° C. for 14 hours and at 170° C. for one hour until the Gardner-Holdt viscosity reached Z4+ at 65 percent solids in methyl isobutyl ketone. At 55 percent solids in methyl isobutyl ketone, the resin had an acid value of 4.05, a hydroxyl value of 14 and a Gardner-Holdt viscosity of V+. The weight average molecular weight of the polyester was 161,000.

When cured with CYMEL 325 as described in Example 1, the film had an elongation of 395 percent, a tensile strength of 2440 psi and a Sward hardness of 10.

EXAMPLE 10

The following shows the preparation of a high molecular weight polyester from hexanediol, trimethylolpropane, adipic acid and isophthalic acid. The initial charge for preparing the polyester is as follows:

| Ingredient | Parts by Weight |
|---|---|
| hexanediol | 1196 |
| trimethylolpropane[1] | 187 |
| adipic acid | 616 |
| isophthalic acid[2] | 1023 |
| dibutyltin oxide | 1.0 |

[1] 0.23 gram-mole of trimethylolpropane per 500 grams of resin.
[2] Weight percentage of cyclic moieties was 15.49.

The ingredients were charged to a reaction vessel as described in Example 1 and heated to about 220° C. for 7 hours until 340 parts of water had been removed. At this stage, the viscosity was low (Gardner-Holdt viscosity of F⁻ at 56 percent solids in methyl isobutyl ketone), and the acid value was low (AV=7.00).

To 1448 parts of the reaction mixture were added 50 parts of adipic acid and 150 parts of diisoamyl ketone. Reaction was conducted at 190° to 205° C. for 11 hours until a Gardner-Holdt viscosity of X⁻ at 55 percent solids in methyl isobutyl ketone was reached.

The resultant polyester at a solids content of 57 percent had an acid value of about 4 and a hydroxyl value of 28. The polyester had a weight average molecular weight of 73,357 and a sprayability of 19 percent. When cured with CYMEL 325 (65 percent polyester/35 percent CYMEL 325) under the conditions of curing described in Example 1, the film had an elongation of 40 percent and a Sward hardness of 10.

EXAMPLE 11

The following shows the preparation of a high molecular weight polyester with a low level of triol. The initial charge for preparing the polyester is as follows:

| Ingredient | Parts by Weight |
|---|---|
| neopentyl glycol | 3714 |
| trimethylolpropane[1] | 272 |
| adipic acid | 1909 |
| isophthalic acid[2] | 3253 |
| dibutyltin oxide | 2 |

[1] 0.11 gram-mole of trimethylolpropane per 500 grams of resin.
[2] Weight percentage of cyclic moieties was 16.28.

The ingredients were charged to a reaction vessel as described in Example 1 and heated to about 220° C. for 10 hours until about 1170 parts of water had been removed. At this stage, the viscosity was low (Gardner-Holdt viscosity of E-F at 62 percent solids in methyl isobutyl ketone), and the acid value was low (AV=4.62).

To 1686 parts of the reaction mixture was added 132 parts of adipic acid and 202 parts of diisoamyl ketone. Reaction was conducted at 190° to 220° C. for 20 hours until a Gardner-Holdt viscosity of W at 55 percent solids was reached.

The resultant polyester at a solids content of 55 percent in methyl isobutyl ketone had an acid value of about 4. The polyester had a weight average molecular weight of 52,524 and a sprayability of 22 percent. When cured with CYMEL 325 (75 percent polyester/25 percent CYMEL 325) under the conditions of curing described in Example 1, the film had an elongation of 168 percent, a tensile strength of 2660 psi and a Sward hardness of 16. When cured under similar conditions with 70 percent polyester and 30 percent CYMEL 325, a film having a tensile strength of 3920 psi, an elongation of 125 percent and a Sward hardness of 16 was obtained.

EXAMPLE 12

A two-pack system comprising a polyester of the invention and polyisocyanate curing agent was prepared from 76 percent by weight of the polyester of Example 1 and 24 percent by weight of a polyisocyanate formed from reacting one mole of trimethylolpropane and 3 moles of isophorone diisocyanate. When the polyester and polyisocyanate were mixed together and the mixture deposited on an elastomeric polyurethane substrate and cured at 150° F. (66° C.) for 30 minutes, a film having a thickness of about 1.8 mils and which had an elongation of 320 percent and a tensile strength of 3712 psi was obtained.

This particular system makes an excellent topcoat for elastomeric parts to which a layer of chrome is applied by vacuum deposition or sputtering techniques.

Comparative Examples

The following examples of polyesters found in U.S. Pat. No. 3,691,258 were prepared by the procedure described in column 10, line 15.

The mixture of diols, polyol and diacids were heated under agitation while a small nitrogen stream is passed through the mixture. The following time-temperature plan is used: two hours at 140° C.; two hours at 160° C.; four hours at 180° C.; four hours at 190° C.; and 47 hours at 200° C. Then the agitation is continued for 15 minutes at 200° C. under a vacuum of 20 torr (mmHg). The following table describes the results.

3,691,258. In Examples 1 and 2, relatively low molecular weight polyesters were obtained, whereas in Example 8, the resin gelled.

A series of paints prepared with various polyesters of the preceding examples of the invention were prepared. The polyesters were cured with CYMEL 325 and the paints were pigmented with either titanium dioxide for white coatings or phthalo blue (20 percent) and aluminum flake (80 percent) for blue coatings. The paints were spray applied to an elastomeric substrate (EPDM rubber commercially available from E. I. duPont de Nemours as NORDEL and cured at 250° F. (121° C.) for 30 minutes to form a cured coating having a thickness of about 1.8 to 2.5 mils. The gloss of freshly cured coatings was measured with a 20° gloss meter and measured again after a nine month outdoor exposure in Florida, U.S.A. The degree of gloss retention is a measure of the exterior durability of the coating. The results are reported in the table below. For the purposes of comparison, two aminoplast cured polyurethane elastomeric coating compositions commercially available from PPG Industries, Inc. as DURETHANE 100 and DURETHANE 200 were also evaluated. The commercially available polyurethanes were spray applied, cured and exposed under the same conditions as the coating compositions of the present invention.

The coatings of the invention shown in the Table evidenced no cracking when bent around a ¼ inch diameter mandrel at room temperature after 9 months outdoor exposure.

| Polyester | Weight Ratio[4] of Polyester/Pigment Grinding Vehicle/Aminoplast | Initial 20° Gloss | 20° Gloss After 9 Months Exposure | % Gloss Retention | Color |
|---|---|---|---|---|---|
| Ex. 1 | 60.5/18.5[1]/20 | 81 | 47 | 57 | white |
| Ex. 1 | 55.5/18.5[1]/25 | 77 | 45 | 57 | white |
| Ex. 1 | 64/15[2]/20 | 80 | 33 | 41 | white |
| Ex. 1 | 59/15[2]/25 | 79 | 39 | 49 | white |
| Ex. 10 | 49/15[2]/35 | 82 | 14 | 17 | white |
| Ex. 11 | 64/15[2]/20 | 80 | 9 | 11 | white |
| Ex. 11 | 54/15[2]/30 | 75 | 24 | 32 | white |
| DURETHANE 100 | | 77 | 9 | 11 | white |
| DURETHANE 200 | | 75 | 1 | 1.3 | white |
| Ex. 1 | 70/9[2]/20 | 70 | 24 | 34 | blue |
| Ex. 1 | 65/9[2]/25 | 75 | 21 | 28 | blue |
| Ex. 11 | 55/9[2]/35 | 65 | 24 | 37 | blue |
| Ex. 12 | 70/9[2]/20 | 71 | 4 | 6 | blue |
| Ex. 12 | 60/9[2]/30 | 71 | 13 | 18 | blue |
| DURETHANE 100 | | 78 | 9 | 12 | blue |
| DURETHANE 200 | | 59 | 0 | 0 | blue |

[4]Each coating contained 1% by weight based on resin weight of cellulose acetate butyrate. The weight ratio is based on total weight of polyester, pigment grinding vehicle, aminoplast and cellulose acetate butyrate.
[1]In these examples, the polyester of Ex. 1 was employed as the pigment grinding vehicle.
[2]In these examples, an imine-modified polyester was employed as the grinding vehicle.

| U.S. Pat. No. 3,691,258 Example No. | Acid Value | Hydroxyl Value | Number Average Molecular Weight* | Weight Average Molecular Weight* |
|---|---|---|---|---|
| 1 | 5.37 | 153 | 679.7 | 1855.4 |
| 2 | 2.22 | 135 | 911.8 | 2950.1 |
| 8 | ** | | gel | gel |

*Number and weight average molecular weights are determined by GPC as described above.
**Acid number was 11.6 before gelation.

The above experimental results show the skill required in preparing the high molecular weight polyesters in accordance with the present invention and the fact that such high molecular weight polyesters are not prepared by the procedures described in U.S. Pat. No.

We claim:

1. In a coating composition comprising a resinous binder and optionally pigment and diluent in an amount sufficient to provide the coating composition with a sufficient viscosity for coating, the improvement comprising:
using as the resinous binder an ungelled polyester having a hydroxyl value of 10–160 and a weight average molecular weight of about 50,000 to 300,000 as determined by gel permeation chromatography using a polystyrene standard, formed from reacting:
(A) 10 to 70 percent by weight of a difunctional active hydrogen component having two active hydrogens per molecule selected from the class consisting of hydroxyl, primary amine and secondary amine, said active hydrogen component comprising:
(1) 10 to 60 percent by weight of an acrylic diol having a carbon to oxygen ratio of at least 2,
(2) up to 60 percent by weight of a cyclic diol,
(3) up to 20 percent by weight of a compound selected from the class consisting of diamines and hydroxyl-containing amines;

(B) 25 to 85 percent by weight of a dicarboxylic acid component comprising:
(1) 5 to 85 percent by weight of an acyclic dicarboxylic acid containing from 2 to 36 carbon atoms,
(2) up to 80 percent by weight of a cyclic dicarboxylic acid;

(C) up to 30 percent by weight of an active hydrogen component having at least three active hydrogens per molecule, the active hydrogens being selected from the class consisting of hydroxyl, primary amine, secondary amine and carboxylic acid;

(D) up to 20 percent by weight of a monoamino monocarboxylic acid;

the percentages by weight being based on total weight of (A), (B), (C) and (D), the percentages of the reactants being adjusted such that the weight percentages of cyclic moieties in said polyester plus the weight percentages of amide moieties formed in said polyester multiplied by 4 is up to 35 and the weight percentages of the reactants being further adjusted such that these reactants contain about 0.01 to 1.0 gram-mole of reactants having a functionality of 3 or more per 500 grams of reactants.

2. The polyester of claim 1 in which the acyclic diol is selected from the class consisting of hexanediol and neopentyl glycol and mixtures thereof.

3. The polyester of claim 1 in which (C) is selected from the class consisting of trimethylolpropane, pentaerythritol, glycerine, dimethylol propionic acid and mixtures thereof.

4. The polyester of claim 1 in which the cyclic dicarboxylic acid is selected from the class consisting of phthalic acid, terephthalic acid and isophthalic acid, hydrogenated derivatives thereof and mixtures thereof.

5. The polyester of claim 1 in which the acyclic dicarboxylic acid is adipic acid.

6. The polyester of claim 1 which has a hydroxyl value of 40–100.

7. The polyester of claim 1 which has a weight average molecular weight of 80,000 to 150,000.

8. The polyester of claim 1 which contains from 0.20 to 0.70 gram-mole of reactants having a functionality of 3 or more per 500 grams of reactants.

9. The composition of claim 1 in combination with a curing agent.

10. The composition of claim 9 in which the curing agent is selected from the class consisting of aminoplast and polyisocyanates.

11. The composition of claim 10 in which the polyester comprises from 20 to 95 percent by weight of the composition and the curing agent from 80 to 5 percent by weight of the composition, the percentage by weight being based on total weight of polyester and curing agent.

12. A coated article comprising:
(A) a substrate and as a coating thereon
(B) the cured resinous composition of claim 10.

13. The coated article of claim 12 in which the coating has a thickness of 0.1 to 5 mils.

14. The coated article of claim 12 in which the substrate is elastomeric.

15. The coated article of claim 12 in which the coating is pigmented.

16. The coated article of claim 15 in which a portion of the pigments are metallic pigments.

17. A paint composition comprising:
(A) the composition of claim 10,
(B) pigment,
(C) liquid diluent present in an amount sufficient to reduce the paint composition viscosity for coating applications.

18. The paint of claim 17 in which the pigment-to-resin weight ratio is within the range of 0.05 to 1.5:1.

19. In a coating composition comprising a resinous binder and optionally pigment and diluent in an amount sufficient to provide the coating composition with a sufficient viscosity for coating, the improvement comprising:
using as the resinous binder an ungelled polyester having a hydroxyl value of 10–160 and a weight average molecular weight of about 50,000 to 300,000 as determined by gel permeation chromatography using a polystyrene standard, formed from reacting:

(A) 10 to 70 percent by weight of a difunctional active hydrogen component having two active hydrogens per molecule selected from the class consisting of hydroxyl, primary amine and secondary amine, said active hydrogen component comprising:
(1) 10 to 60 percent by weight of an acyclic diol having a carbon to oxygen ratio of at least 2,
(2) up to 60 percent by weight of a cyclic diol,
(3) up to 20 percent by weight of a compound selected from the class consisting of diamines and hydroxyl-containing amines;

(B) 25 to 85 percent by weight of a dicarboxylic acid component comprising:
(1) 5 to 85 percent by weight of an acyclic dicarboxylic acid containing from 2 to 36 carbon atoms,
(2) up to 80 percent by weight of a cyclic dicarboxylic acid;

(C) up to 30 percent by weight of an active hydrogen component having at least three active hydrogens per molecule, the active hydrogens being selected from the class consisting of hydroxyl, primary amine, secondary amine and carboxylic acid;

(D) up to 20 percent by weight of a monoamino monocarboxylic acid;

the percentages by weight being based on total weight of (A), (B), (C) and (D), the percentages of the reactants being adjusted such that the weight percentages of cyclic moieties in said polyester plus the weight percentages of amide moieties formed in said polyester multiplied by 4 is up to 35 and the weight percentages of the reactants being further adjusted such that these reactants contain about 0.1–1.0 gram-mole of reactants having a functionality of 3 or more per 500 grams of reactants; said polyester being used in combination with a curing agent capable of reacting with the hydroxyl groups to form a crosslinked product.

20. The polyester of claim 19 which has a weight average molecular weight of 80,000 to 150,000.

21. The polyester of claim 19 which has a hydroxyl value of 40 to 100.

22. The composition of claim 19 in which the curing agent is selected from the class consisting of aminoplasts and polyisocyanates.

23. The composition of claim 22 in which the polyester comprises from 20 to 95 percent by weight of the composition and the curing agent from 80 to 5 percent by weight of the composition, the percentage by weight being based on total weight of polyester and curing agent.

24. A coated article comprising:
(A) a substrate and as a coating thereon
(B) the cured resinous composition of claim 22.

25. A paint composition comprising:
(A) the composition of claim 22,
(B) pigment,
(C) liquid diluent present in an amount sufficient to reduce the paint composition viscosity for coating applications.

* * * * *

UNITED STATES PATENT AND TRADEMARK OFFICE
CERTIFICATE OF CORRECTION

PATENT NO. : 4,205,115

DATED : May 27, 1980

INVENTOR(S) : Robert M. Piccirilli et al

It is certified that error appears in the above–identified patent and that said Letters Patent are hereby corrected as shown below:

Column 27, line 3, "acrylic" should be --acyclic--.

Signed and Sealed this

Twelfth Day of August 1980

[SEAL]

Attest:

Attesting Officer

SIDNEY A. DIAMOND

Commissioner of Patents and Trademarks